June 20, 1944.    R. BRAUN    2,351,916
TOOL WITH HARDMETAL CUTTING EDGE
Filed Jan. 30, 1941
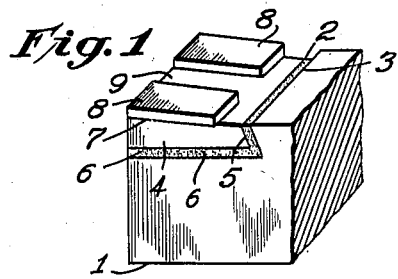
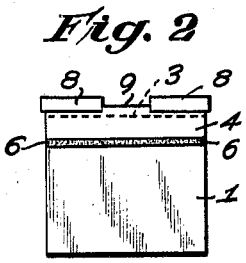
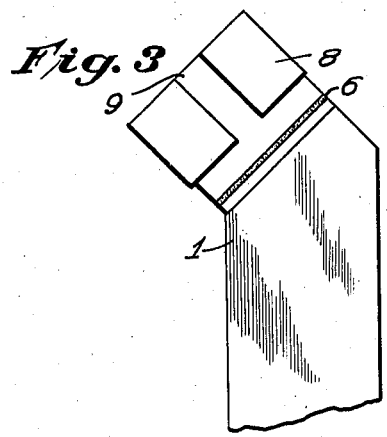
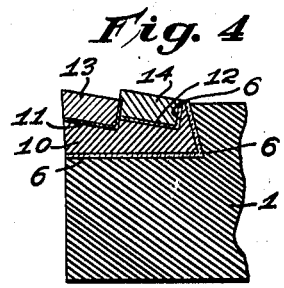
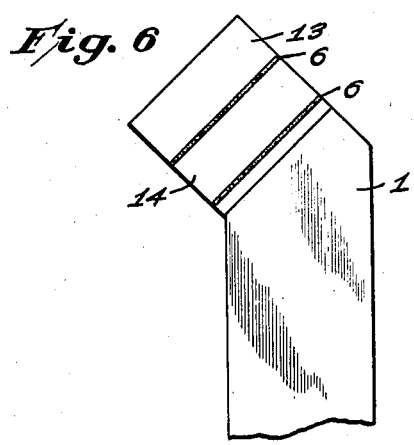
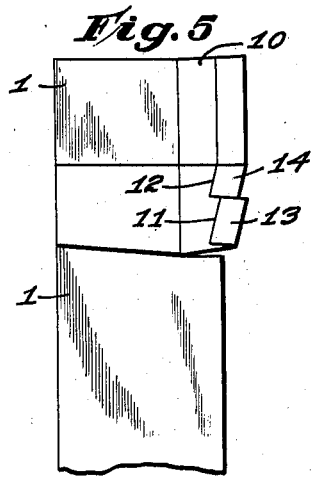
Inventor
RICHARD BRAUN
By  *A. M. Holcombe*
Attorney.

Patented June 20, 1944

2,351,916

UNITED STATES PATENT OFFICE 2,351,916

TOOL WITH HARD METAL CUTTING EDGE

Richard Braun, Stuttgart, Germany; vested in the Alien Property Custodian

Application January 30, 1941, Serial No. 376,570
In Germany January 16, 1940

18 Claims. (Cl. 29—95).

The invention relates to tools, for instance lathe tools of known character having a cutting member of hardmetal or of a hardmetal-alloy disposed, for example, by soldering on a shank of base metal, the shank being made preferably of common steel or the like. Tools of this kind are known wherein the cutting body of hardmetal is connected with the shank by an intermediate layer of a tough metal for the purpose of avoiding the inconveniences of the direct soldering of the hardmetal on the common steel of the shank. It has already been proposed to provide at the junction between cutting body and tool shank a thin plate of molybdenum, nickel iron or chromium nickel; this intermediate layer is, however, not suited for taking up great mechanical stresses. Tools are also known wherein the intermediate layer is formed by a thick-walled trough-like body which separates the cutting body from the tool shank on all sides or along the most important contacting faces, the cutting body being embedded in the trough-like body. The cutting body is first soldered to or welded together with the trough, and then the trough, and if desired the cutting body, are fastened on the tool shank. The trough may be formed by walls abutting at right angles embedded in corresponding recesses of the tool shank, so that the surface of the tool shank is flush with the surface of the hardmetal body.

A drawback of this structure resides in the necessity of grinding the cutting angle directly on the hardmetal body, an operation requiring special experience and knowledge which are usually not found in many establishments.

Another drawback of the known structure results from the embedding of the hardmetal body within the walls of the intermediate layer or of the shank. Due to the irregular heat expansion of the different materials incident to soldering at the required high temperatures, this leads to cracks in the hardmetal body or to damage of the hardmetal cutting edge and impairs the preservation of the cutting property. It has been proposed to obviate this danger by making the trough of a metal of similar heat expansion as the cutting body. The suggestion is, however, difficult to realize because the shank and trough consist of different materials which oppose a perfectly satisfactory bond.

The invention avoids these and other drawbacks and furnishes numerous advantages compared with the known tools of similar kind.

According to the invention, the intermediate layer is preferably made of alloyed steel and is constructed to function as a pressure support for the member or members forming the hardmetal cutting edges. This pressure support is equipped with the required cutting angles, so that the members forming the hardmetal cutting edges can be made in the form of simple, flat plates and can be positioned on the pressure support at the correct cutting angles. This eliminates the necessity of grinding the cutting edges on the hard metal members. The manufacture of such tools is thereby considerably simplified and rendered less expensive. The replacing of worn or damaged hardmetal cutting members is at the same time considerably facilitated because the cutting angles on the pressure support are preserved regardless of the condition of wear of the members forming the cutting edges.

The hardmetal bodies are inserted in recesses provided in the pressure support, the depth of which is less than the thickness of the hardmetal plates, so that these plates partly project therefrom. Formation of cracks in or other damage to the hardmetal cutting bodies and the cutting edges thereon by irregular heat stresses occurring incident to the soldering or incident to the cutting operations are thereby prevented.

If the tool is to be provided with several cutting edges, the hardmetal body is preferably subdivided into several individual plates, which are independently inserted, for a portion of their thickness in corresponding recesses of the pressure support and united with the support by soldering. Hardmetal is thereby saved and the exchanging of individual worn cutting plates instead of a whole cutting body of larger size is made possible. The hardmetal plates are embedded in the pressure support in such manner that the surface of the support situated between the individual hardmetal cutting edges is disposed below the surface of the hardmetal plates, so that the latter can be properly ground without affecting the metal of the pressure support.

Several hardmetal bodies may also be arranged one in back of the other in stepped recesses of the pressure support, so that when the forwardly located cutting edge is worn, the next following cutting edge will be ready for use. This arrangement permits the provision of a great cutting angle with substantially uniform thickness of the pressure support. If one of the hardmetal plates is destroyed only this plate and not the whole fitting of hardmetal plates need be exchanged and renewed.

If the pressure support is made of alloyed steel, that is, of a material which is of a structure similar to that of the shank, the bond with the shank can be obtained with easily melting solder at a moderate temperature from about 600 to 700°; this operation requires no special knowledge and ability, and damaging of the previously finished-ground hardmetal cutting edges by heat expansions or impairing of the preservation of cutting property of the cutting edges by oxide-formation are securely avoided. In order to obtain a reliable perfect bond, the pressure support is shaped wedge-like at its rear end so that it can enter into a dove-tail shaped undercutting of the shank wall, and is thus strongly anchored incident to the soldering operation. The resistance of the bond against the pressures occurring in the use of the tool is thereby advantageously increased.

Two embodiments of the invention are diagrammatically illustrated by way of example in the accompanying drawing, in which Fig. 1 shows in perspective view the end of a tool shank with two separate hardmetal cutting edges;

Fig. 2 illustrates an end view of the structure shown in Fig. 1;

Fig. 3 is a top plan view of Fig. 1;

Fig. 4 represents a vertical section through a tool with two cutting edges of hardmetal arranged one in back of the other;

Fig. 5 is a side view of the tool of Fig. 4; and Fig. 6 shows a top plan view of Fig. 4.

The tool body or shank 1 may be made of suitable steel. It is provided with a recess 2, the rear wall 3 of which is undercut to form a dove-tail-shaped groove.

In the structure shown in Figs. 1 to 3, a pressure support 4 of alloyed steel is mounted in this recess and its wedge-shaped rear end 5 engages in the dove-tail groove and is connected with the shank by a layer 6 of easily melting solder. The pressure support has two recesses in its surface, the base faces 7 of these recesses having the inclination corresponding to the cutting angle. A thin cutting plate 8 of hardmetal is mounted in each recess, and is connected with the pressure support by a suitable highly-melting solder, projecting upwardly therefrom, so that the central portion 9 of the pressure support disposed between the two cutting bodies 8 is situated lower than the surfaces of the cutting bodies and is therefore not affected by the wear of the cutting bodies.

In the embodiment shown in Figs. 4 to 6 the rear end of the pressure support 10 is also wedge-shaped and in engagement with a dovetail-shaped undercut of the tool shank 1. The carrying surface of the pressure support for holding the cutting bodies is in this instance provided with two step-like inclined faces 11, 12 disposed in back of each other, the inclination of these faces corresponding to the cutting angle desired. The cutting bodies 13, 14 of hardmetal are soldered on the pressure support, so that their cutting edges are also disposed step-like one in back of the other. If the front cutting body 13 is worn or damaged, the cutting body 14 situated behind it can be used in its place.

I claim:

1. A cutting tool comprising a tool body, said body having a cutout therein, a supporting member disposed in said cutout and bonded to said tool body, said supporting member being provided with an inclined recess at an angle corresponding to the cutting angle of the tool, and a hardmetal substantially flat plate disposed in said recess and bonded thereto constituting the cutting edge of said tool.

2. The structure defined in claim 1, wherein said cutout is disposed at the end of said tool body extending generally axially thereof, the rear end of said cutout being inclined to the axis of said tool body to form a groove for anchoring said supporting member disposed therein, said groove sloping away from said end of the tool body and from the top towards the bottom of said tool body.

3. The structure defined in claim 1, wherein said cutout is undercut at one end thereof to anchor said supporting body disposed therein, the undercut sloping rearwardly of the tool body and from the top towards the bottom of the tool body.

4. The structure defined in claim 1, wherein the thickness of said hardmetal plate exceeds the depth of said inclined recess in said supporting member.

5. The structure defined in claim 1, wherein said hardmetal plate projects from said recess above the surface of said supporting member.

6. The structure defined in claim 1, wherein said tool body is made of a material such as common steel, and wherein said supporting member is preferably made of alloyed steel.

7. A cutting tool of the class described comprising a tool body, a rearwardly undercut cutout therein, said tool body having a rearwardly wedge-shaped supporting member disposed in said cutout and soldered thereto, the face of said supporting member having a plurality of inclined recesses therein, the incline of the recesses corresponding to the cutting angle of the cutting edge of said tool, and a hardmetal member disposed in each of said recesses and forming said cutting edges.

8. The structure defined in claim 7, wherein said hardmetal members are positioned along a line transverse of the axis of the tool.

9. The structure defined in claim 7, wherein said hardmetal members are positioned in spaced relation to each other along a line transverse of the axis of the tool.

10. The structure defined in claim 7, wherein said hardmetal members project from said supporting member above the surface thereof.

11. The structure defined in claim 7, wherein said hardmetal members are positioned in spaced relation to each other along a line transverse of the axis of the tool, the surface of said members projecting above the surface of said supporting member located therebetween.

12. The structure defined in claim 7, wherein said hardmetal members are positioned in series relation axially of the tool.

13. The structure defined in claim 7, wherein the recesses in the face of said supporting member extend crosswise of the tool axis parallel to each other and in angularly step-like relation axially of the tool.

14. A lathe cutting tool comprising an elongated tool body preferably made of common machine steel, said tool body having a cutout at one end thereof forming a rearwardly undercut dove-tail-like recess therein, a rearwardly wedge-shaped supporting member preferably made of alloyed steel fitted into said recess and soldered thereto, a plurality of faces ground in said supporting member at an angle corresponding substantially to the cutting angle of the tool, and a hardmetal plate-like member attached to each of said faces and forming the cutting edges of said tool.

15. The structure defined in claim 14, wherein said hardmetal plate-like members project from the surface of said supporting member.

16. The structure defined in claim 14, wherein said hardmetal plate-like members are positioned in parallel to each other along lines paralleling the axis of said supporting member.

17. The structure defined in claim 14, wherein said hardmetal plate-like members are positioned in parallel to each other along lines transverse of the axis of said supporting member.

18. The process of making a cutting tool of the class described, comprising forming a groove in the material of a tool body, fitting into said groove a supporting body, forming on said supporting body a surface inclined at an angle corresponding substantially to the cutting angle of the tool, placing on said surface a hardmetal body to form the cutting edge of the tool, and bonding said hardmetal body with said supporting body and the latter with the tool body at a temperature which does not impair said hardmetal body by oxidation.

RICHARD BRAUN.